(12) United States Patent
McHugh et al.

(10) Patent No.: US 9,531,764 B1
(45) Date of Patent: Dec. 27, 2016

(54) HISTORY INCLUSIVE CONNECTION MANAGEMENT

(71) Applicant: Amazon Technologies, Inc., Reno, NV (US)

(72) Inventors: Jason George McHugh, Seattle, WA (US); Svend Knarhoj Johannsen, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 513 days.

(21) Appl. No.: 13/686,832

(22) Filed: Nov. 27, 2012

(51) Int. Cl.
*G06F 15/16* (2006.01)
*H04L 29/06* (2006.01)
*H04L 29/08* (2006.01)
*H04L 12/26* (2006.01)

(52) U.S. Cl.
CPC ....... *H04L 65/1069* (2013.01); *H04L 43/0811* (2013.01); *H04L 67/14* (2013.01)

(58) Field of Classification Search
CPC .......... H04L 2029/06054; H04L 29/06; H04L 43/00; H04L 43/16; H04L 67/14; H04L 67/1008; H04L 67/101; H04L 67/1029; H04L 67/2819; H04L 67/2842; H04L 67/1002; H04L 67/32; H04L 69/14; H04L 69/28; H04L 69/329; H04L 47/193; H04L 69/163; H04L 67/2852; H04L 41/0893; H04L 63/20; G06F 13/00; Y10S 707/99937

USPC ......................................................... 709/227
See application file for complete search history.

(56) References Cited

U.S. PATENT DOCUMENTS

| 6,438,597 B1 * | 8/2002 | Mosberger .............. H04L 69/16 709/227 |
| 8,204,998 B1 * | 6/2012 | Upadhyay et al. ........... 709/228 |
| 2002/0042828 A1 * | 4/2002 | Peiffer .......................... 709/227 |
| 2004/0023641 A1 * | 2/2004 | Tsutsumi .......... H04M 1/72519 455/411 |
| 2006/0182141 A1 * | 8/2006 | Duggirala et al. ............. 370/465 |
| 2006/0200849 A1 * | 9/2006 | Sundarrajan et al. ........ 725/110 |
| 2009/0172058 A1 * | 7/2009 | Cormode et al. ............. 708/274 |
| 2012/0158825 A1 * | 6/2012 | Ganser ........................ 709/203 |
| 2013/0322329 A1 * | 12/2013 | Visuri ................... H04W 48/16 370/328 |

* cited by examiner

*Primary Examiner* — Joshua Joo
(74) *Attorney, Agent, or Firm* — Polsinelli LLP

(57) ABSTRACT

Different types of connections can be established between a device and an endpoint (e.g., an address associated with a service) based at least in part upon the recent connection history for that endpoint. A connection manager can monitor the connections, and properties of those connections, from a number of different applications of a device to one or more endpoints. If the information from the system as a whole indicates that properties for the connection should be modified, an appropriate can be established for that endpoint, which can be used by any or all of those applications. The connection can meet or exceed any policies for the request, as well as other requests that can utilize the connection. Various other factors can be used in determining which types of connections to provide, as may include existing connections, system load, user type, and other such information.

30 Claims, 5 Drawing Sheets

HISTORY INCLUSIVE CONNECTION MANAGEMENT

BACKGROUND

As an increasing number of applications and services are being made available over networks such as the Internet, an increasing number of content, application, and/or service providers are turning to technologies such as cloud computing. Cloud computing, in general, is an approach to providing access to electronic resources through services, such as Web services, where the hardware and/or software used to support those services is dynamically scalable to meet the needs of the services at any given time. A user or customer can obtain access to various services through the cloud, or across at least one network, and thus does not have to purchase and maintain the hardware and/or software associated with the services. In some cases, a computing device for a user might include several different applications that each requires access to one or more of these services. Each time one of these applications wants to access one of the services, a connection is established to allow for the necessary communications.

Establishing and tearing down a large number of connections, however, leads to various inefficiencies. Each time a single request and single response connection is opened and/or closed there is some computational overhead involved. Further, there can be handshakes with the destination service on various network layers that each add a delay before a connection is opened. In some systems ongoing connections can be used to a destination service, but such connections introduce additional overhead because the connection must be kept alive with heartbeats, and unless the number of communications justifies the overhead a significant amount of time and resources can be wasted.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments of the present disclosure overcome one or more of the above-referenced and other deficiencies in conventional approaches to providing and/or managing network connections. In particular, various embodiments enable different types of connections to be established or utilized for requests to a specified endpoint based at least in part upon the recent connection history for that endpoint. In at least some embodiments, a component such as a communication engine or connection engine can monitor the connections from a number of different applications of a device to one or more endpoints (e.g., specific network addresses or other such destinations). A request for a connection can include at least one policy including characteristics for the connection. If there is an existing, available connection that at least satisfies any policy for the request, the existing connection is used for the request. If such an existing connection does not exist or is not available, information about the system as a whole, including information about present and past connection and their properties, amount of available memory, remaining battery life, and other such information, can be used to determine a set of characteristics fitting for a new connection to an endpoint. In some embodiments, a communication engine or similar component can monitor the number of connections to an endpoint that were closed over a recent period of time. If the number of connection closures meets or exceeds a connection threshold, a long-lived (e.g., persistent) connection (e.g., a bi-directional, encrypted, and/or compressed connection) can be established for that endpoint, which can be used by any or all of those applications. If less than the threshold number of connection closures has been detected, a single request/response connection can be established for a request to that endpoint. The number of connection closures can decay over time, such that more recent behavior dictates the types of connections used. Further, each application or caller can specify one or more policies for the connection, which can then be mapped to physical connections that at least meet or satisfy those policies. When a long-lived connection is to be established in at least some embodiments, a communication engine can analyze the information for requests to that endpoint, as well as information for the system as a whole, and attempt to satisfy as many of the policies as possible, in order to maximize use of the connection and minimize the number of connections needed. Various other factors can be used in determining which types of connections to provide, such factors including, for example, existing connections, system load, time of day, battery life, user type, and other such information.

Various other applications, processes, and uses are presented below with respect to the various embodiments.

Figure 1:
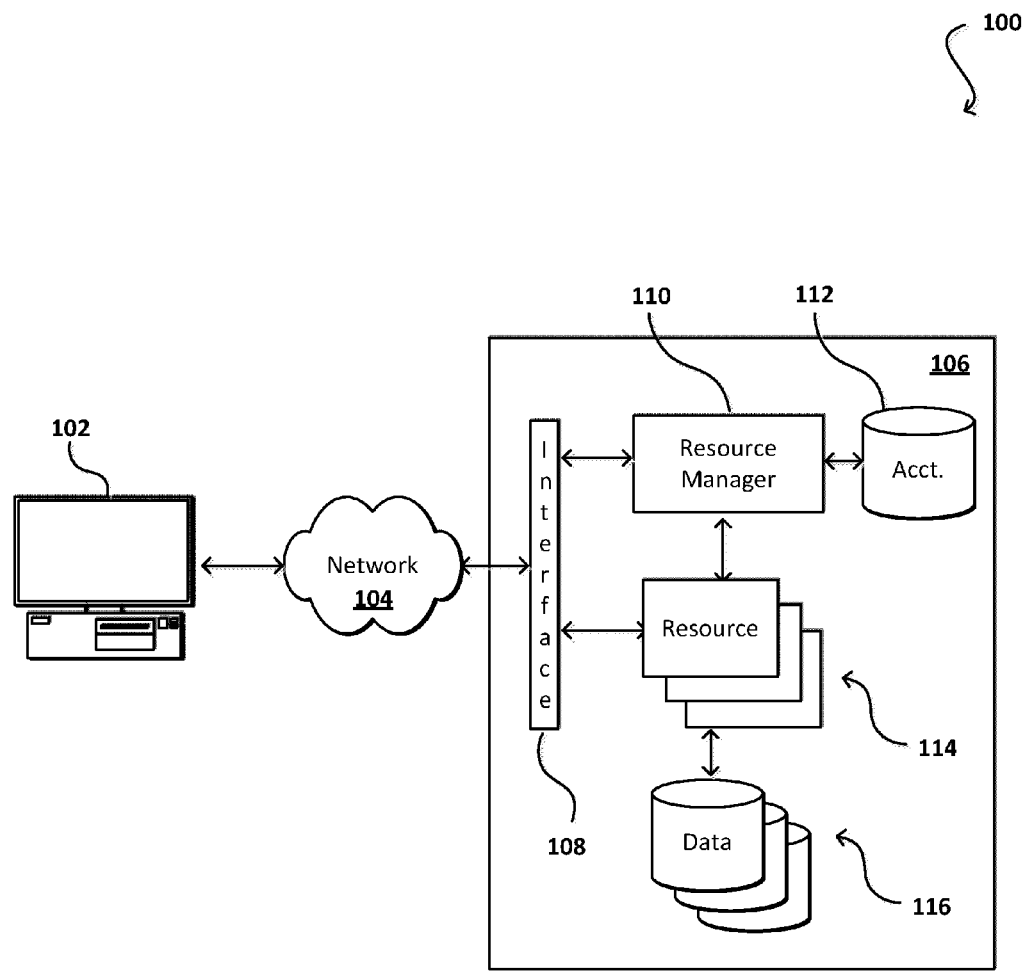
FIG. 1 illustrates an example environment in which various aspects can be implemented.

FIG. 1 illustrates an example environment 100 in which aspects of the various embodiments can be implemented. In this example a user is able to utilize a client device 102 to communicate across at least one network 104 with a resource provider environment 106. The client device can include any appropriate electronic device operable to send and receive requests, messages, or other such information over an appropriate network and convey information back to a user of the device. Examples of such client devices include personal computers, tablet computers, smart phones, notebook computers, and the like. The network(s) 104 can include any appropriate network, including an intranet, the Internet, a cellular network, a local area network (LAN), or any other such network or combination, and communication over the network can be enabled via wired and/or wireless connections. The resource provider environment 106 can include any appropriate components for receiving requests and returning information or performing actions in response to those requests. As an example, the provider environment might include Web servers and/or application servers for receiving and processing requests, then returning data, Web pages, video, audio, or other such content or information in response to the request.

In various embodiments, the provider environment may include various types of resources that can be utilized by multiple users or applications for a variety of different purposes. In at least some embodiments, all or a portion of a given resource or set of resources might be allocated to a particular user or allocated for a particular task, for at least a determined period of time. The sharing of these multi-tenant resources from a provider environment is often referred to as resource sharing, Web services, or "cloud computing," among other such terms and depending upon the specific environment and/or implementation. In this example, the provider environment includes a plurality of resources 114 of one or more types. These types can include, for example, application servers operable to process instructions provided by a user or database servers operable to process data stored in one or more data stores 116 in response to a user request. As known for such purposes, the user can also reserve at least a portion of the data storage in a given data store. Methods for enabling a user to reserve various resources and resource instances are well known in the art, such that detailed description of the entire process, and explanation of all possible components, will not be discussed in detail herein.

In at least some embodiments, an application executing on the client device 102 that needs to access or utilize a portion of the resources 114, which might be exposed as one or more services to which the application has subscribed, can submit a request that is received to an interface layer 108 of the provider environment 106. The interface layer can include application programming interfaces (APIs) or other exposed interfaces enabling a user to submit requests, such as Web service requests, to the provider environment. The interface layer 108 in this example can also include other components as well, such as at least one Web server, routing components, load balancers, and the like. When a request to access a resource is received at the interface layer 108 in some embodiments, information for the request can be directed to a resource manager 110 or other such system, service, or component configured to manage user accounts and information, resource provisioning and usage, and other such aspects. A resource manager 110 receiving the request can perform tasks such as to authenticate an identity of the user submitting the request, as well as to determine whether that user has an existing account with the resource provider, where the account data may be stored in at least one data store 112 in the provider environment.

An interface layer 108 in at least one embodiment includes a scalable set of customer-facing servers that can provide the various APIs and return the appropriate responses based on the API specifications. The interface layer also can include at least one API service layer that in one embodiment consists of stateless, replicated servers which process the externally-facing customer APIs. The interface layer can be responsible for Web service front end features such as authenticating customers based on credentials, authorizing the customer, throttling customer requests to the API servers, validating user input, and marshaling or un-marshaling requests and responses. The API layer also can be responsible for reading and writing database configuration data to/from the administration data store, in response to the API calls. In many embodiments, the Web services layer and/or API service layer will be the only externally visible component, or the only component that is visible to, and accessible by, customers of the control service. The servers of the Web services layer can be stateless and scaled horizontally as known in the art. API servers, as well as the persistent data store, can be spread across multiple data centers in a region, for example, such that the servers are resilient to single data center failures.

Figure 2:
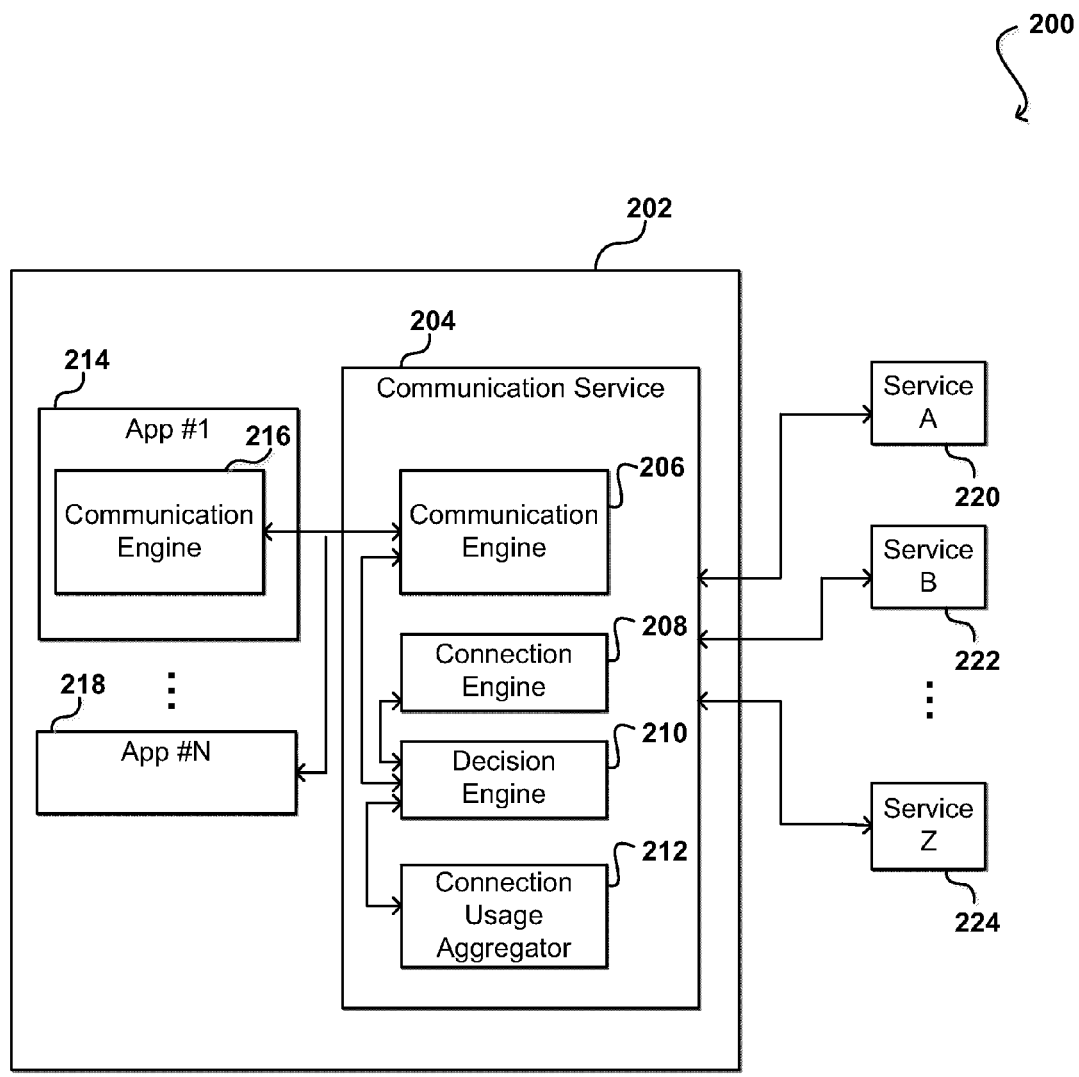
FIG. 2 illustrates an example system for managing connections that can be utilized in accordance with the various embodiments.

As discussed above, it can be necessary for connections to be established between a computing device and a resource environment in order to allow for communications between the device and the appropriate service(s) offered through that environment. FIG. 2 illustrates an example configuration 200 for providing network connection selection and management that can be utilized in accordance with various embodiments. The example configuration 200 includes a computing device 202 that has stored upon it code for executing one or more applications 214, 218, as well as a communication service 204. In this example, at least a portion of the applications on the device can require access to one or more services 220, 222, 224 available from one or more service providers. When an application 214 wants to communicate with one of these services 220, the application 214 can utilize an application-side communication engine 216 to contact a communication service 204. The communication service 204 can establish or allocate an appropriate connection to the service, assuming any connection criteria are met in at least some embodiments, as discussed elsewhere herein. In at least some embodiments, each application can specify one or more policies for the connection, and the communication service can attempt to provide a connection that at least satisfies those policies, and may, in fact, provide a higher level of service in at least some embodiments. In at least some embodiments, the one or more policies for a connection, specified by each application or user, can be mapped to physical connections that at least meet those policies.

In at least some embodiments, one or more policies can be provided or specified when requesting a connection. As used herein, a policy refers to a collection of desired and/or required characteristics for a connection. Whether the characteristics are desired or required can depend at least in part upon their nature. For example, characteristics around security typically are required characteristics, while characteristics around the life-cycle of a connection are typically desired characteristics. When a connection is established, properties are assigned to the connection that are the characteristics of the connection.

The communication service 204 can function as a single, (logically) centralized connection service through which all communications between applications on a computing device and associated services can pass. In at least some embodiments, a communication service can also, or alternatively, be contained within at least one of the applications 214, 218. In some embodiments, the individual applications 214, 218 can be combined into a single effective application that includes a communication service. The communication service can receive requests for connections from the applications, determine appropriate connections to the appropriate services that meet or exceed a policy for the various requests, and manage those connections on behalf of the applications. For some applications, establishing a connection can include first establishing a connection, such as a TCP connection for TCP/IP implementations. Establishing a TCP connection can involve one or more round trips of messages, as callers requiring an encrypted and (sometimes mutually) authenticated communication channel, which may utilize SSL, might require three or more additional round trips between the service and the device. Once the connection is established, the first byte for the application request can be sent to the service over the connection. In at least some cases, these requests will be encoded as HTTP requests/responses. When the request and response are completed, the connection can be shut down. The shutdown of a TCP connection can be relatively efficient, but can still require a four step process.

In an example where there is around 200 milliseconds of latency between a device and a service, this can result in over one second of delay before the first byte of the request can be received by the service. That is a lot of time, particularly for a large number of use cases common in many applications. Under certain circumstances, it might be appropriate to accept that cost, as the alternative is to establish a connection and leave the connection open. There are at least three fundamental costs associated with leaving the connection open. The first is that the connection must be maintained, requiring any intermediate network devices (e.g., load balancers) to consume memory and resources to maintain the connection. The second cost relates to the memory resource that is required on the device to maintain the connection. The third cost relates to the cost of the respective portion of the service (e.g., the box to which the device has connected), which must maintain system resources necessary to maintain the open connection and receive data along that connection.

In some embodiments, the communication engine might provide one or more fully bi-directional communication channels, which in at least some embodiments can utilize WebSockets. WebSockets require a WebSocket handshake, which is a single back and forth that is part of the WebSocket protocol. In at least some embodiments, a communication engine 206 of the communication service 204 might execute a tuning service on top of the WebSocket handshake process. As part of establishing a connection, the communication engine 206 can determine the underlying protocol that will be used for the duration of the connection, as well as any connection requirements, such as whether compression is necessary, whether the connection should be bi-directional, whether the connection needs to have at least a minimum amount of compression, etc. There are at least two round trips involved for establishing the connection in at least some embodiments. Ignoring any additional round trips necessary for SSL or TCP, there can be a round trip added for establishing a WebSocket, for example, and two or three round trips for the communication engine to tune the connection. Thus, there still can be a significant amount of additional overhead before the first byte is ever put on the wire. If there will be multiple requests from one or more applications on the device to a common service, however, the overhead can be amortized over the lifetime of the channel, resulting in a net savings based on the number of requests. While it can be more expensive to establish a feature-rich, long-lived connection that can be re-used over time, the ability to send multiple requests from multiple applications over the connection can justify the additional expense. As discussed, the ability to provide a connection that at least meets connection policies for multiple applications can further justify the expense, as fewer dedicated connections will need to be provided.

Since the communication service 204 is utilized by multiple applications, the communication service can provide options to the various applications that could not be made by any of the individual applications. In particular, the communication service can look at the needs of all the applications on a device when making connection decisions for a single application request, whereas an application that does not know of the other applications cannot make such decisions. A communication engine 216 for an application could only make connection decisions or requests based on the needs of the associated application 214. These can include not only the number of connections for various applications, but the properties of those connections for each application.

In at least some embodiments, the communication engine 206 can work with a connection manager 208 that is configured to manage the opening and closing of communication channels, as well as querying for existing connections and their properties. The usage of various communication channels and connections can be monitored by a component or service such as a connection usage aggregator 212. The connection usage aggregator can monitor the endpoints of each communication, how many times connections to those endpoints were opened and closed, properties of the connections, and other such information. When a request for a connection between one of the applications 214, 218 and one of the services 220, 222, 224 is received by the communication engine 206, the communication engine can contact the decision engine 210. The decision engine 210 can contact the connection usage aggregator 212 to obtain relevant information about the requested connection, such as how many times over a recent period of time a connection to the same endpoint was opened and/or closed. The connection usage aggregator 212 can then provide this information to a decision engine 210 that can determine the type of connection to provide for the request. Once a decision is made regarding the type of connection and its properties, the connection manager 208 can be contacted to manage the establishment and maintenance of the connection. In at least some embodiments, the connection usage aggregator 212 can also provide the usage data to any entity implementing an appropriate interface associated with the aggregator.

In certain embodiments, the connection usage aggregator 212 tracks the number of connections that were closed for a particular endpoint, such as an interface for a particular service. A counter can be incremented each time a connection is closed to that endpoint, independent of the application causing the connection to be established. In at least some embodiments, the tracking can be based at least in part upon one or more properties of the connections that were closed. In at least some embodiments, an exponential decay can be provided that causes the count to decrease over time. Such an approach can be desirable, as closing ten connections over the last second might justify the opening of a WebSocket (or other long-lived bidirectional communication channel), but ten connections closed over the last hour might not. Other approaches can be used when aggregating the number of connections closed over a period of time, such as using a threshold or cutoff, etc. Further, the amount of decay and/or period of time used to make decisions can vary as well between embodiments, based on any of a number of factors such as system load, number of existing connections, time of day, battery life, etc.

In at least some embodiments, a connection threshold can be established for use in determining the type of connection to provide. If, for example, a number of connections to an endpoint that were closed over a specified period of time meets or exceeds the threshold, a long-lived, bi-directional channel can be established. The time period and number can be set or can vary in different embodiments, and different thresholds might be used for different applications, services, connection parameters, etc. Other factors can be considered as well, which might affect the level of the threshold. For example, different threshold values might be used for different types of users, different service level agreements, different device capacities, different communication properties, or other such factors. Further, multiple thresholds for an endpoint might be specified, where each threshold relates to connections to that endpoint having at least a specified connection property.

In at least some embodiments, a connection manager 208 can provide single connections, such as standard HTTP connections, or fully bi-directional connection, such as WebSocket connections. In the case of a long-lived connection, the communication engine 206 or connection manager 208 can be charged with sending periodic heartbeats such that the connection remains open.

In at least some embodiments, the connection manager 208 can first try to reuse an existing connection in response to receiving a request from an application. If a channel to the appropriate endpoint exists that at least meets any connection policy for the application, the decision engine can decide to use that connection for the request. As discussed, the connection provided might have additional properties that the application did not specify, such as compression or security, where the additional properties will not negatively impact the application and where a new connection does not need to be established. If such a connection is not available, the connection manager can attempt to establish a new connection, with the type of connection being based in part upon the recent number of closed connections to the endpoint and any connection properties specified by the application.

In some embodiments, a user or entity might determine that the system should optimize for power or throughput, among other such options. In such a case, the thresholds might adjust such that additional long-lived channels are established, which increases power consumption but improves throughput, or fewer bi-directional channels are established, which reduces power consumption but also decreases throughput. In some embodiments, the threshold can be set as a balance of throughput and power consumption, and the threshold might vary throughout the day as power consumption or load vary.

In some embodiments, the connection usage aggregator 212 might also obtain or generate statistics or data about trends in connection usage. For example, if there are typically a large number of connections to an endpoint at a particular period of time each day, then the decision engine 210 might use that data to preemptively open a long-lived connection to that endpoint around the particular period of time. Decisions can be made based at least in part on other factors as well, such as the amount of time it would take to establish each type of connection, the resources available to support long-lived connections, the various types of connection parameters requested, and remaining battery life or other operational parameter, among others.

In some embodiments, the communication service 204 can reside in its own process space. The service 204 can facilitate inter-process communication (IPC) among applications, the communication service, and the services. In some embodiments, the communication service can always be running, waiting, and/or listening for communications from one or more applications on the device 202. The communication engine 206, connection manager 208, decision engine 210, and connection usage aggregator 212 can each reside in the process space of the communication service 204. In some embodiments, an application can request for a connection and specify one or more properties of its required and/or preferred connection in the form of one or more "connection policies." In some embodiments, a subset of the one or more connection policies includes required connection policies while another subset includes desired connection policies. The communication engine 206 can gather information about the current state of the system (including information about the needs of other applications or services) and determine whether or not it is possible to provide a connection that satisfies the connection policy(ies) (i.e., whether or not to provide the application's required and/or preferred connection). For example, a connection request can require a minimum amount of throughput and desire high bandwidth. If the communication engine 206 determines that all high bandwidth connections are power/battery-intensive and the system is in a low power state, then the interface can decide not to provide a connection that would be power intensive but instead provide a connection requiring less power. However, the connection must still satisfy the required connection policy specifying a minimum amount of throughput. In another example, if an application requests an encrypted connection to a particular endpoint and the communication engine 206 determines that an encrypted connection to that server already exists and is available, then the broker interface can provide to the application the already existing encrypted connection.

Discussing connection policies in more detail, one or more connection policies can specify one or more properties required and/or preferred for a requested connection. For example, an application can specify in a connection policy that it requires a connection with a certain amount of throughput (e.g., high throughput, low throughput). In another example, an application can specify in one or more connection policies that it desires a connection that is encrypted, compressed, free or low cost (e.g., unlimited WiFi, paid/subsidized by third party), but throughput does not matter. Other examples of connection policies include (but are not limited to) latency (e.g., direct connection to an endpoint/server or connection via proxy, fast or slow, etc.), semantics (e.g., request/response semantics or advanced semantics, etc.), type (e.g., multi-tenant characteristics) of connection (e.g., preexisting connection is allowed or must be new connection, etc.), throughput, cost, and priority (e.g., high, normal, low, etc.). Moreover, further connection policy examples can include, but are not limited to, a roaming allowed policy (e.g., can a roaming connection be selected), a short-lived policy (e.g., does the connection need to last for a long time), a request response only policy (e.g., will the connection only be used for request-response functionality), a secure connection requirement policy (e.g., connection must be secure), and/or a WiFi requirement policy (e.g., connection must be established over WiFi). Again, desired connection policies are not necessarily guaranteed to be satisfied because such policies from an individual application are likely not as important as global optimization for the system and all applications. On the other hand, required connection policies must be satisfied in the connection to be delivered/established in response to the connection request. As discussed, connections can be provided that satisfy additional connection policies, as long as the properties of those connections meet or exceed any policy specified by the calling application.

The connection manager 208 can make available, track, and/or manage one or more connections to facilitate IPC. The connection manager can read and/or write data on the connections. As mentioned, in some embodiments, the connections can be standard HTTP/TCP connections. The connections can also be WebSockets or SPDY, for example, which can provide for full-duplex, two-way communications over a single TCP connection. WebSockets can be used in web browsers, web servers, and client and server applications. In some embodiments, data on the connection can be delivered to a TCP stack within a kernel and go on to a NIC for transmission. The connections can connect the one or more apps to various endpoints/servers.

Each of the one or more applications can be any software, program, module, process, mobile app, etc. In some embodiments, each application can reside in its own process space. In some embodiments, an application can have a library (e.g., client-side library) for communication infrastructure. The library can be used to access the communication engine 120 of the application.

In some embodiments, the communication service 204 can access information regarding how different types of connections are performing. These types of connections can include, but are not limited to, 2G, 3G, WiFi, 4G, device-to-device Bluetooth/Bluetooth-direct, device-to-device WiFi/WiFi-direct, etc. Based on the information regarding how these different types of connections are performing, the communication service can elect to switch among the various connection types depending on various factors (e.g., current state information including the needs of apps) with the goal of achieving global optimization of the system.

In at least one embodiment, a decision engine 210 can use a formula to calculate, based at least in part upon the recent number of connections, whether to open a bi-directional connection instead of a single request and single response connection. An example of one such formula is given by:

$$O_s*n > O_b + H_b*t$$

where $O_s$ is the one-time overhead for establishing a single request and single response connection, n is the number of single request and single response connections established, $O_b$ is the one time overhead for establishing a long-lived connection, and $H_b$ is the overhead for heart beating a single long-lived connection over a period of time. It can be possible to choose values for n and t such that the above is true, wherein a long-lived connection can be desirable over a single request and single response connection.

Figure 3:
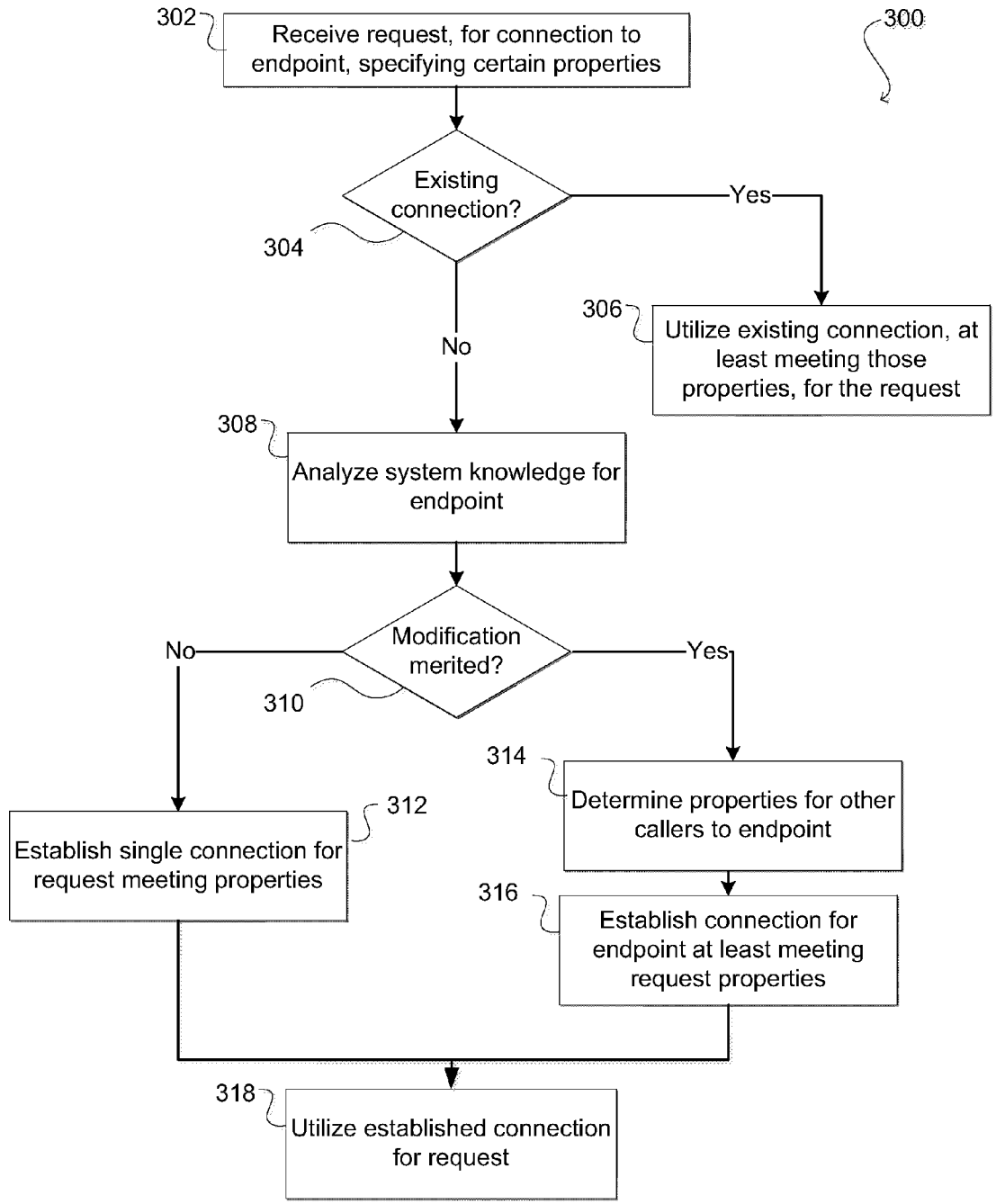
FIG. 3 illustrates an example process for selecting connections for requests that can be utilized in accordance with various embodiments.

FIG. 3 illustrates an example process 300 for determining a type of communication channel to provide for a request that can be utilized in accordance with various embodiments. It should be understood that there can be additional, fewer, or alternative steps performed in similar or alternative orders, or in parallel, within the scope of the various embodiments unless otherwise stated. In this example, a request for a connection to an endpoint is received 302 from an application, wherein the request may include at least one connection policy or criterion specified by the application. A determination can be made 304 as to whether there is an existing connection to that endpoint that is available and at least satisfies any connection policies for the request. As discussed, the connection might have additional properties that the application does not care about. If so, that existing connection can be utilized 306 for the request. If not, knowledge of the system as a whole for that endpoint can be analyzed 308, where that knowledge can include information about past, present, and predicted future connections and their properties. Based at least in part upon the system information as a whole, a determination can be made whether modification of properties for a connection is merited 310. In at least some embodiments, this can include determining a number of connections closed to that endpoint over a recent period of time. If property modification is not merited, in at least one embodiment a single request/response connection, or other such simple connection, can be established 312 for the request. If modification is determined to be merited for that endpoint, policies for other requests (e.g., past, present, and predicted future requests) to that endpoint can be determined 314. In at least one embodiment, a long-lived connection that at least meets those policies can be established 316. The established connection then can be utilized 318 for communications associated with the request. As discussed, the connection that is established can satisfy not only one or more policies or criteria set forth by a calling application, but also other policies or properties specified by other applications. Such an approach enables fewer (or more) connections to be established, which can reduce resource consumption and improve system performance in the long or short term.

In embodiments where multiple applications can use a single connection to an endpoint, the communication service can provide automatic multiplexing among the applications. Moreover, the communication service can automatically attempt to ensure general fairness regarding the sharing of the connection among the plurality of applications in at least some embodiments, or can provide priority to certain applications in other embodiments. As already stated above, it is also possible for an application to specify as a connection policy to not share a connection but rather use a single connection by itself, in which case there can be an attempt to satisfy the policy, but with potentially no guarantees.

Figure 4:
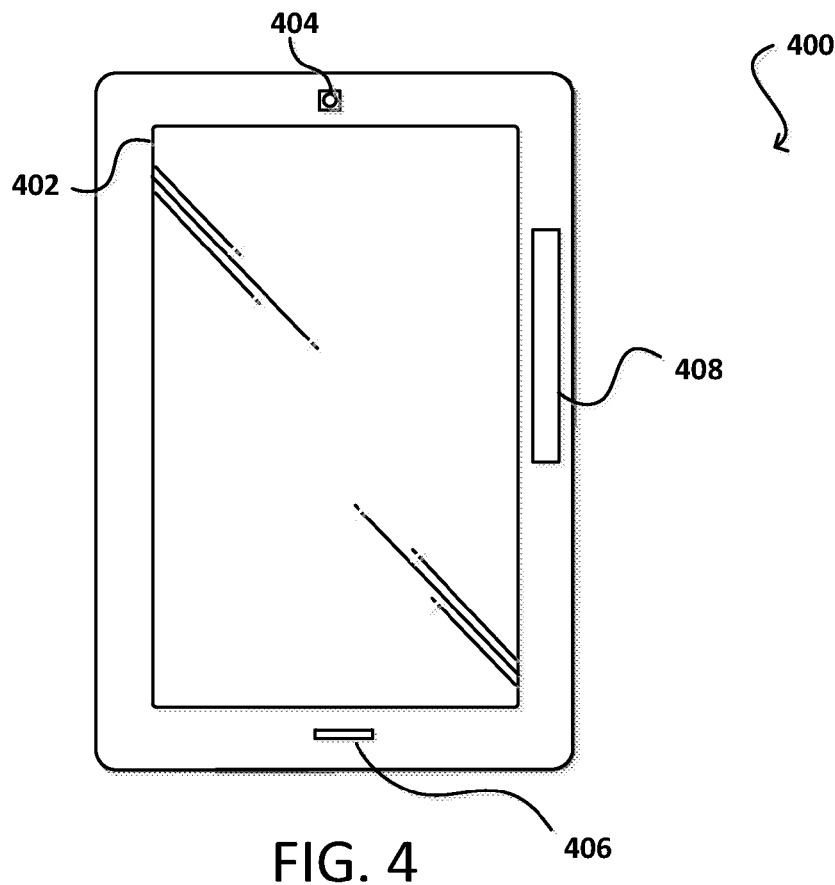
FIG. 4 illustrates an example device that can be used to implement aspects of the various embodiments.

FIG. 4 illustrates an example electronic user device 400 that can be used in accordance with various embodiments. Although a portable computing device (e.g., an electronic book reader or tablet computer) is shown, it should be understood that any electronic device capable of receiving, determining, and/or processing input can be used in accordance with various embodiments discussed herein, where the devices can include, for example, desktop computers, notebook computers, personal data assistants, smart phones, video gaming consoles, television set top boxes, and portable media players. In this example, the computing device 400 has a display screen 402 on the front side, which under normal operation will display information to a user facing the display screen (e.g., on the same side of the computing device as the display screen). The computing device in this example includes at least one camera 404 or other imaging element for capturing still or video image information over at least a field of view of the at least one camera. In some embodiments, the computing device might only contain one imaging element, and in other embodiments the computing device might contain several imaging elements. Each image capture element may be, for example, a camera, a charge-coupled device (CCD), a motion detection sensor, or an infrared sensor, among many other possibilities. If there are multiple image capture elements on the computing device, the image capture elements may be of different types. In some embodiments, at least one imaging element can include at least one wide-angle optical element, such as a fish eye lens, that enables the camera to capture images over a wide range of angles, such as 180 degrees or more. Further, each image capture element can comprise a digital still camera, configured to capture subsequent frames in rapid succession, or a video camera able to capture streaming video.

The example computing device 400 also includes at least one microphone 406 or other audio capture device capable of capturing audio data, such as words or commands spoken by a user of the device. In this example, a microphone 406 is placed on the same side of the device as the display screen 402, such that the microphone will typically be better able to capture words spoken by a user of the device. In at least some embodiments, a microphone can be a directional microphone that captures sound information from substantially directly in front of the microphone, and picks up only a limited amount of sound from other directions. It should be understood that a microphone might be located on any appropriate surface of any region, face, or edge of the device in different embodiments, and that multiple microphones can be used for audio recording and filtering purposes, etc.

The example computing device 400 also includes at least one orientation sensor 408, such as a position and/or movement-determining element. Such a sensor can include, for example, an accelerometer or gyroscope operable to detect an orientation and/or change in orientation of the computing device, as well as small movements of the device. An orientation sensor also can include an electronic or digital compass, which can indicate a direction (e.g., north or south) in which the device is determined to be pointing (e.g., with respect to a primary axis or other such aspect). An orientation sensor also can include or comprise a global positioning system (GPS) or similar positioning element operable to determine relative coordinates for a position of the computing device, as well as information about relatively large movements of the device. Various embodiments can include one or more such elements in any appropriate combination. As should be understood, the algorithms or mechanisms used for determining relative position, orientation, and/or movement can depend at least in part upon the selection of elements available to the device.

Figure 5:
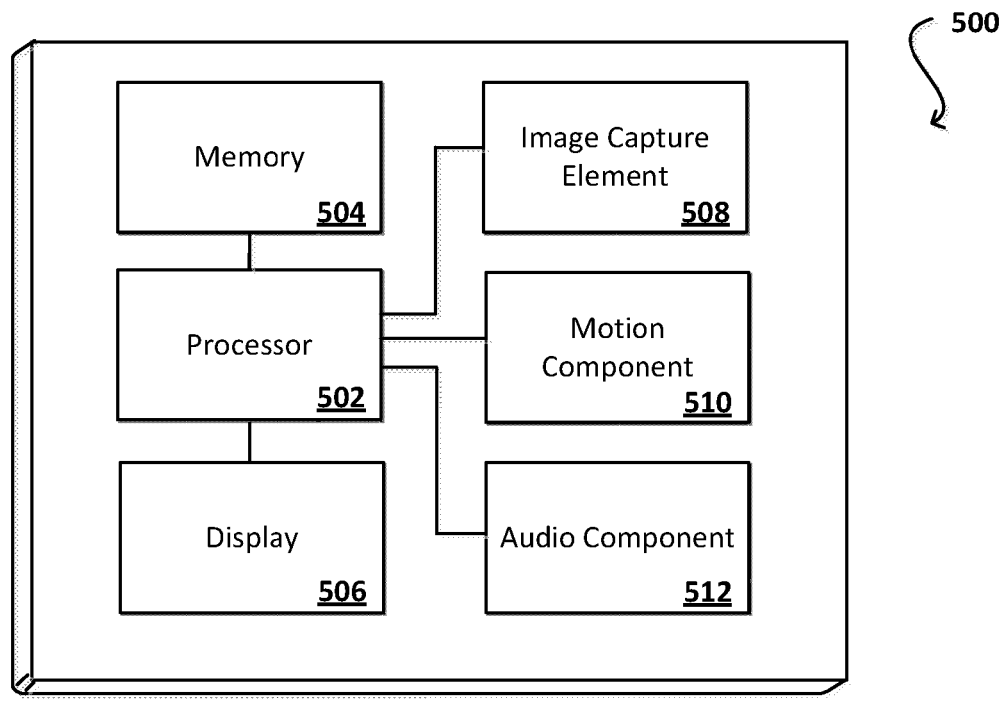
FIG. 5 illustrates example components of a client device such as that illustrated in FIG. 4.

FIG. 5 illustrates a logical arrangement of a set of general components of an example computing device 500 such as the device 400 described with respect to FIG. 4. In this example, the device includes a processor 502 for executing instructions that can be stored in a memory device or element 504. As would be apparent to one of ordinary skill in the art, the device can include many types of memory, data storage, or non-transitory computer-readable storage media, such as a first data storage for program instructions for execution by the processor 502, a separate storage for images or data, a removable memory for sharing information with other devices, etc. The device typically will include some type of display element 506, such as a touch screen or liquid crystal display (LCD), although devices such as portable media players might convey information via other means, such as through audio speakers. As discussed, the device in many embodiments will include at least one image capture element 508 such as a camera or infrared sensor that is able to image projected images or other objects in the vicinity of the device. Methods for capturing images or video using a camera element with a computing device are well known in the art and will not be discussed herein in detail. It should be understood that image capture can be performed using a single image, multiple images, periodic imaging, continuous image capturing, image streaming, etc. Further, a device can include the ability to start and/or stop image capture, such as when receiving a command from a user, application, or other device. The example device similarly includes at least one audio capture component 512, such as a mono or stereo microphone or microphone array, operable to capture audio information from at least one primary direction. A microphone can be a uni- or omni-directional microphone as known for such devices.

In some embodiments, the computing device 500 of FIG. 5 can include one or more communication elements (not shown), such as a Wi-Fi, Bluetooth, RF, wired, or wireless communication system. The device in many embodiments can communicate with a network, such as the Internet, and may be able to communicate with other such devices. In some embodiments the device can include at least one additional input device able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device.

The device 500 also can include at least one orientation or motion sensor 510. As discussed, such a sensor can include an accelerometer or gyroscope operable to detect an orientation and/or change in orientation, or an electronic or digital compass, which can indicate a direction in which the device is determined to be facing. The mechanism(s) also (or alternatively) can include or comprise a global positioning system (GPS) or similar positioning element operable to determine relative coordinates for a position of the computing device, as well as information about relatively large movements of the device. The device can include other elements as well, such as may enable location determinations through triangulation or another such approach. These mechanisms can communicate with the processor 502, whereby the device can perform any of a number of actions described or suggested herein.

As an example, a computing device such as that described with respect to FIG. 4 can capture and/or track various information for a user over time. This information can include any appropriate information, such as location, actions (e.g., sending a message or creating a document), user behavior (e.g., how often a user performs a task, the amount of time a user spends on a task, the ways in which a user navigates through an interface, etc.), user preferences (e.g., how a user likes to receive information), open applications, submitted requests, received calls, and the like. As discussed above, the information can be stored in such a way that the information is linked or otherwise associated whereby a user can access the information using any appropriate dimension or group of dimensions.

Figure 6:
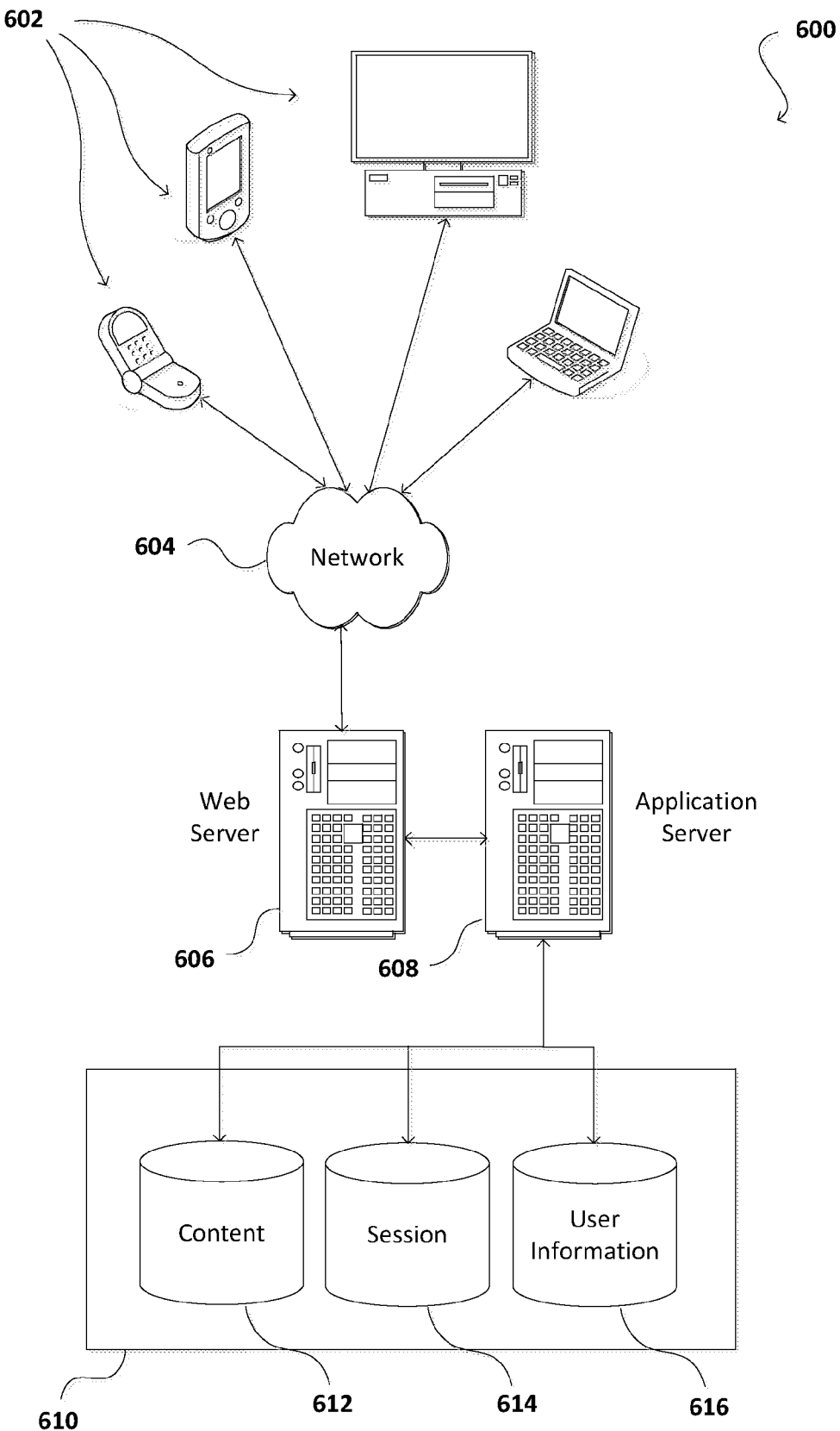
FIG. 6 illustrates an example environment in which various embodiments can be implemented.

As discussed, different approaches can be implemented in various environments in accordance with the described embodiments. For example, FIG. 6 illustrates an example of an environment 600 for implementing aspects in accordance with various embodiments. As will be appreciated, although a Web-based environment is used for purposes of explanation, different environments may be used, as appropriate, to implement various embodiments. The system includes an electronic client device 602, which can include any appropriate device operable to send and receive requests, messages or information over an appropriate network 604 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 606 for receiving requests and serving content in response thereto, although for other networks an alternative device serving a similar purpose could be used, as would be apparent to one of ordinary skill in the art.

The illustrative environment includes at least one application server 608 and a data store 610. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 602 and the application server 608, can be handled by the Web server 606. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log or session data 614. It should be understood that there can be many other aspects that may need to be stored in the data store, such as page image information and access rights information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of element. In this case, the data store might access the user information to verify the identity of the user and can access the catalog detail information to obtain information about elements of that type. The information can then be returned to the user, such as in a results listing on a Web page that the user is able to view via a browser on the user device 602. Information for a particular element of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the system 600 in FIG. 6 should be taken as being illustrative in nature and not limiting to the scope of the disclosure.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Various aspects also can be implemented as part of at least one service or Web service, such as may be part of a service-oriented architecture. Services such as Web services can communicate using any appropriate type of messaging, such as by using messages in extensible markup language (XML) format and exchanged using an appropriate protocol such as SOAP (derived from the "Simple Object Access Protocol"). Processes provided or executed by such services can be written in any appropriate language, such as the Web Services Description Language (WSDL). Using a language such as WSDL allows for functionality such as the automated generation of client-side code in various SOAP frameworks.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method for determining a connection, comprising:

receiving a request from an application of a plurality of applications executing on a computing device, the request specifying an address associated with a service, the service being provided using one or more resources of a multi-tenant environment;

determining a connection policy corresponding to the request, the connection policy specified by the application sending the request, the connection policy specifying one or more properties of the request for the connection;

when no existing connection is available that meets or exceeds the connection policy specified by the application:

analyzing system information regarding at least one of past, present, and predicted future requests from the plurality of applications to the address, the system information representing at least a first number of connections closed over a first period of time, and a second number of connections closed over a second period of time, the first period of time shorter than the second period of time;

establishing a single request/response connection for the request when modification of connection parameters is determined to not be merited based at least in part on the system information, the single request/response connection satisfying the connection policy specified by the application; and establishing a persistent connection between the computing device and the address when modification of connection parameters is determined to be merited based at least in part on the system information, the persistent connection meeting or exceeding the connection policy specified by the application.

2. The computer-implemented method of claim 1, further comprising:

determining specific connection criteria for a newly-established, persistent connection such that the specific connection criteria satisfies existing connection criteria for present requests and additional criteria for at least one of a number of previous or predicted future requests.

3. The computer-implemented method of claim 1, wherein analyzing the system information comprises applying greater weight to the first number of connections closed.

4. The computer-implemented method of claim 1, further comprising:

updating a connection threshold value for establishing a persistent connection based upon at least one condition associated with at least one of the plurality of applications, the computing device, a user of the computing device, or a system providing the service.

5. The computer-implemented method of claim 1, further comprising:

utilizing an existing connection for the request when an existing connection to the address is available, the existing connection meeting or exceeding the connection policy corresponding to the request.

6. A computer-implemented method, comprising:

receiving a request for a connection to an address, the request being received from an application executing on a computing device;

determining a connection policy corresponding to the request, the connection policy specified by the application sending the request, the connection policy specifying one or more properties of the request for the connection;

providing an existing connection for the request when the existing connection exists between the computing device and the address and is available for the request and properties of the existing connection meet or exceed a policy for the request;

analyzing system information for the address if no existing connection is available between the computing device and the address, the system information representing at least a first number of connections closed over a first period of time, and a second number of connections closed over a second period of time, the first period of time shorter than the second period of time; and establishing a new connection between the computing device and the address, wherein the new connection is based at least in part upon the system information for the address, wherein the new connection satisfies or exceeds the connection policy specified by the application.

7. The computer-implemented method of claim 6, wherein the new connection includes a single request/response connection or a persistent connection.

8. The computer-implemented method of claim 6, wherein the new connection further at least satisfies at least a portion of one or more additional connection policies specified by at least one other application executing on the computing device.

9. The computer-implemented method of claim 6, wherein the connection policy specifies characteristics relating to at least one of encryption, authentication, a requested protocol, a type of compression, a power limit, latency, use of a proxy, or a throughput requirement.

10. The computer-implemented method of claim 6, further comprising:
monitoring the first number of connections, between the computing device and the address, that are closed over a specified period of time, the first number of connections capable of being associated with any of a plurality of applications executing on the computing device, and storing information for the first number of connections with the system information.

11. The computer-implemented method of claim 10, wherein establishing the new connection includes establishing a persistent connection when the first number of connections that were closed at least meets a connection threshold value.

12. The computer-implemented method of claim 10, wherein establishing the new connection includes establishing a single request/response connection when the first number of connections that were closed is less than a connection threshold value.

13. The computer-implemented method of claim 10, further comprising:
updating a connection threshold value based at least in part upon at least one of a current request volume, a type of application associated with the request, a connection property associated with the request, a type of user associated with the request, or an operational state of the computing device.

14. The computer-implemented method of claim 10, further comprising:
causing the first number of connections to decay over time.

15. The computer-implemented method of claim 10, further comprising:
detecting trends in the first number of connections; and pre-emptively establishing one or more connections based at least in part upon the trends in the first number of connections.

16. The computer-implemented method of claim 10, wherein the new connection is a WebSocket connection or a SPDY connection.

17. The computer-implemented method of claim 6, wherein the one or more properties of the request for the connection comprises a certain amount of throughput for the request, and wherein the new connection satisfies or exceeds the certain amount of throughput for the request.

18. The computer-implemented method of claim 6, wherein the one or more properties of the request for the connection comprises a cost amount for the request, and wherein the new connection satisfies the cost amount for the request.

19. The computer-implemented method of claim 6 wherein the one or more properties of the request for the connection comprises a roaming is allowed property for the request, and wherein the new connection satisfies the roaming is allowed property for the request.

20. The computer-implemented method of claim 6 wherein the one or more properties of the request for the connection comprises a time limit for the request, and wherein the new connection satisfies the time limit for the request.

21. The computer-implemented method of claim 6 wherein the one or more properties of the request for the connection comprises a priority for the request, and wherein the new connection satisfies the priority for the request.

22. The computer-implemented method of claim 6 wherein the one or more properties of the request for the connection comprises a single connection that is not shared for the request, and wherein the new connection satisfies the single connection that is not shared for the request.

23. A system, comprising:
at least one processor; and
a memory device including instructions that, when executed by the at least one processor, cause a computing device to:
receive a request for a connection to an address, the request being received from an application executing on the computing device;
determine a connection policy corresponding to the request, the connection policy specified by the application sending the request, the connection policy specifying one or more properties of the request for the connection;
provide an existing connection for the request when the existing connection exists between the computing device and the address;
analyze system information for the address if no existing connection is available between the computing device and the address, the system information representing at least a first number of connections closed over a first period of time, and a second number of connections closed over a second period of time, the first period of time shorter than the second period of time; and
establish a new connection between the computing device and the address, wherein a type of the new connection is based at least in part upon the system information for the address, wherein the type of the new connection satisfies or exceeds the connection policy specified by the application.

24. The system of claim 23, wherein the existing persistent connection at least satisfies one or more connection policies specified by the application executing on the computing device.

25. The system of claim 24, wherein the existing persistent connection further at least satisfies at least a portion of one or more additional connection policies specified by at least one other application executing on the computing device.

26. The system of claim 24, wherein the one or more connection policies specify characteristics relating to at least one of encryption, authentication, a requested protocol, a type of compression, a power limit, latency, use of a proxy, or a throughput requirement.

27. A non-transitory computer-readable storage medium including instructions that, when executed by at least one processor, cause the at least one processor to:
  receive a request for a connection to an address, the request being received from an application executing on a computing device;
  determine a connection policy corresponding to the request, the connection policy specified by the application sending the request, the connection policy specifying one or more properties of the request for the connection;
  provide an available connection for the request when the available connection exists between the computing device and the address;
  analyze system information for the address if no existing connection is available between the computing device and the address, the system information representing at least a first number of connections closed over a first period of time, and a second number of connections closed over a second period of time, the first period of time shorter than the second period of time; and
  establish a new connection between the computing device and the address, wherein a type of the new connection is based at least in part upon the system information for the address, wherein the type of the new connection satisfies or exceeds the connection policy specified by the application.

28. The non-transitory computer-readable storage medium of claim 27, wherein the new connection is a WebSocket connection.

29. The non-transitory computer-readable storage medium of claim 27, wherein the new connection includes a single request/response connection or a persistent connection.

30. The non-transitory computer-readable storage medium of claim 29, wherein the persistent connection at least satisfies one or more connection policies specified by the application executing on the computing device, the persistent connection further meeting or exceeding at least a portion of one or more additional connection policies specified by at least one other application executing on the computing device.

* * * * *